(12) United States Patent
Berardinelli et al.

(10) Patent No.: US 9,544,173 B1
(45) Date of Patent: Jan. 10, 2017

(54) ITERATIVE NORMALIZATION TECHNIQUE FOR REFERENCE SEQUENCE GENERATION FOR ZERO-TAIL DISCRETE FOURIER TRANSFORM SPREAD ORTHOGONAL FREQUENCY DIVISION MULTIPLEXING

(71) Applicant: NOKIA SOLUTIONS AND NETWORKS OY, Espoo (FI)

(72) Inventors: Gilberto Berardinelli, Aalborg (DK); Frank Frederiksen, Klarup (DK); Klaus Ingemann Pedersen, Aalborg (DK); Preben Elgaard Mogensen, Gistrup (DK); Kari Pekka Pajukoski, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/854,474

(22) Filed: Sep. 15, 2015

(51) Int. Cl.
*H04L 27/06* (2006.01)
*H04L 27/26* (2006.01)
*H04L 25/02* (2006.01)

(52) U.S. Cl.
CPC ....... *H04L 27/2613* (2013.01); *H04L 25/0238* (2013.01)

(58) Field of Classification Search
CPC .................. H04L 25/03821; H04L 25/03343; H04L 27/2627; H04L 27/2614; H04J 13/0062
USPC ........................................ 375/340, 229, 260
See application file for complete search history.

(56) References Cited

U.S. PATENT DOCUMENTS

| 2008/0084817 | A1 | 4/2008 | Beckman et al. | |
| 2013/0188679 | A1* | 7/2013 | Li | H04L 25/022 375/229 |
| 2014/0334416 | A1* | 11/2014 | Ko | H04L 5/0053 370/329 |
| 2014/0355725 | A1* | 12/2014 | Shaposhnikov | H04J 13/0062 375/343 |

OTHER PUBLICATIONS

Gilberto Berardinelli, et al.; "Zero-tail DFT-spread-OFDM signals"; Proceeding of Globecom 2013; pp. 229-234; IEEE 2013.

(Continued)

*Primary Examiner* — Khai Tran
(74) *Attorney, Agent, or Firm* — Squire Patton Boggs (US) LLP

(57) ABSTRACT

Systems, methods, apparatuses, and computer program products for generating sequences for zero-tail discrete fourier transform (DFT)-spread-orthogonal frequency division multiplexing (OFDM) (ZT DFT-s-OFDM) reference signals. One method includes adding a zero vector to an input sequence, and performing an iterative manipulation of the input sequence. The performing of the iterative manipulation of the input sequence may include, for example: computing frequency domain response of the sequence, normalizing elements of the computed frequency domain sequence to unitary power while maintaining phase of each of the elements, converting the sequence to time domain, generating a zero-padded sequence by forcing a zero head and tail of the sequence, and repeating the steps until a final sequence with zero-tail and flat frequency response is obtained.

23 Claims, 8 Drawing Sheets

(56) References Cited

OTHER PUBLICATIONS

B. Popovic; "Generalized Chirp-Like Polyphase Sequences with Optimum Correlation Properties"; IEEE Transactions on Information Theory; vol. 38, No. 4, Jul. 1992, pp. 1406-1409.
Erik Dahlman, et al.; "3G Evolution: HSPA and LTE for Mobile Broadband"; Academic Press 2007; 485 pages.
Dror Aiger, et al.; "The Phase Only Transform for unsupervised surface defect detection"; IEEE Conference on Computer Vision and Pattern Recognition (CVPR); IEEE 2010, pp. 295-302.
WO International Search Report dated Nov. 30, 2016, issued in corresponding Application No. PCT/EP2016/071254.
Gilberto Berardinelli et al., "Reference Sequence Design for Zero-Tail DFT-spread-OFDM", IEEE Wireless Conference and Network Conference (WCNC), Apr. 3, 2016. XP032959321, pp. 1-6.

* cited by examiner

ITERATIVE NORMALIZATION TECHNIQUE FOR REFERENCE SEQUENCE GENERATION FOR ZERO-TAIL DISCRETE FOURIER TRANSFORM SPREAD ORTHOGONAL FREQUENCY DIVISION MULTIPLEXING

BACKGROUND

Field

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), future 5G radio access technology, and/or High Speed Packet Access (HSPA). In particular, some embodiments may relate to reference signals for 5G systems.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and radio access functionality is provided in the enhanced Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN provides a new radio access technology and refers to the improvements of UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while keeping the backward compatibility. One of the key features of LTE-A, introduced in LTE Rel-10, is carrier aggregation, which allows for increasing the data rates through aggregation of two or more LTE carriers, e.g., to the transmission bandwidth of up to 100 MHz. LTE-A in later releases may include even wider bandwidths as specified so far. Further, aggregating or interworking on the radio access level with the wireless LAN (WLAN) access network is foreseen.

SUMMARY

One embodiment is directed to a method, which may include (a) adding a zero vector to an input sequence, and (b) performing an iterative manipulation of the input sequence.

In an embodiment, the adding may include adding the zero vector to at least one of a beginning and an end of the input sequence. In certain embodiments, the performing of the iterative manipulation of the input sequence comprises one or more of: (c) computing linear transformation of the sequence, (d) normalizing elements of the computed linear transformation sequence to unitary power while maintaining phase of each of the elements, (e) converting the sequence to time domain, (f) generating a zero-padded sequence by forcing a zero head and tail of the sequence, and (g) repeating steps (c)-(f) until a final sequence with zero-tail and flat frequency response is obtained.

In another embodiment, the performing of the iterative manipulation of the input sequence comprises one or more of: (c) converting the sequence to time domain, (d) generating a zero-padded sequence by forcing a zero head and tail of the sequence, (e) converting the sequence to frequency domain, (f) normalizing elements of the computed linear transformation sequence to unitary power while maintaining phase of each of the elements, and (g) repeating steps (c)-(f) until a final sequence with zero-tail and flat frequency response is obtained.

In one embodiment, the computing of the linear transformation of the sequence further comprises computing frequency domain response of the sequence. According to some embodiments, the number of times steps (c)-(f) are repeated may be configured. In an embodiment, a base station or evolved node B (eNB) performs the configuration.

According to certain embodiments, the method may also include generating a transmit signal by having the final sequence undergo discrete fourier transform (DFT), subcarrier mapping, and inverse fast fourier transform (IFFT). In one embodiment, the method may also include using the generated transmit signal at every successive frame transmission. In some embodiments, the input sequence may be a Zadoff-Chu sequence. In an embodiment, the computing may include computing the frequency domain response of the sequence by discrete fourier transform (DFT). According to one embodiment, the converting may include converting the sequence to time domain by inverse discrete fourier transform (IDFT).

Another embodiment is directed to an apparatus, which may include at least one processor and at least one memory comprising computer program code. The at least one memory and the computer program code are configured, with the at least one processor, to cause the apparatus at least to (a) add a zero vector to an input sequence, and (b) perform an iterative manipulation of the input sequence.

In an embodiment, the at least one memory and the computer program code are further configured, with the at least one processor, to cause the apparatus at least to add the zero vector to at least one of a beginning and an end of the input sequence. In certain embodiments, the at least one memory and the computer program code are further configured, with the at least one processor, to cause the apparatus at least to perform the iterative manipulation of the input sequence according to one or more of the following: (c) compute linear transformation of the sequence, (d) normalize elements of the computed linear transformation sequence to unitary power while maintaining phase of each of the elements, (e) convert the sequence to time domain, (f) generate a zero-padded sequence by forcing a zero head and tail of the sequence, and (g) repeat steps (c)-(f) until a final sequence with zero-tail and flat frequency response is obtained.

According to one embodiment, the at least one memory and the computer program code are further configured, with the at least one processor, to cause the apparatus at least to compute the linear transformation of the sequence by computing frequency domain response of the sequence. In one embodiment, a number of times steps (c)-(f) are repeated can be configured. In certain embodiments, a base station or evolved node B (eNB) performs the configuration.

In an embodiment, the at least one memory and the computer program code are further configured, with the at least one processor, to cause the apparatus at least to generate a transmit signal by having the final sequence undergo discrete fourier transform (DFT), subcarrier mapping, and inverse fast fourier transform (IFFT). According to one embodiment, the at least one memory and the computer program code are further configured, with the at least one processor, to cause the apparatus at least to use the generated transmit signal at every successive frame transmission.

According to certain embodiments, the input sequence comprises a Zadoff-Chu sequence. In an embodiment, the at least one memory and the computer program code are further configured, with the at least one processor, to cause the apparatus at least to compute the frequency domain response of the sequence by discrete fourier transform (DFT). In one embodiment, the at least one memory and the computer program code are further configured, with the at least one processor, to cause the apparatus at least to convert the sequence to time domain by inverse discrete fourier transform (IDFT).

Another embodiment is directed to a computer program, embodied on a non-transitory computer readable medium, the computer program configured to control a processor to perform a process, which may include (a) adding a zero vector to an input sequence, and (b) performing an iterative manipulation of the input sequence.

BRIEF DESCRIPTION OF THE DRAWINGS

For proper understanding of the invention, reference should be made to the accompanying drawings, wherein.

DETAILED DESCRIPTION

Figure 1:
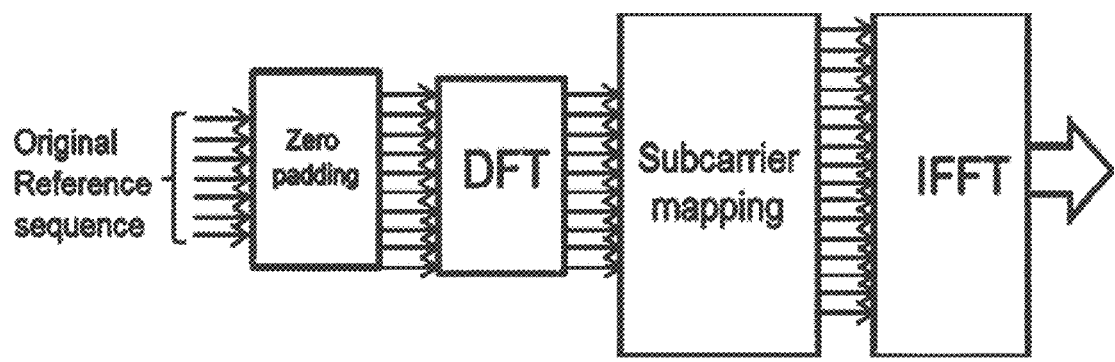
FIG. 1 illustrates an example block diagram of a ZT DFT-s-OFDM transmitter chain.

It will be readily understood that the components of the invention, as generally described and illustrated in the figures herein, may be arranged and designed in a wide variety of different configurations. Thus, the following detailed description of embodiments of systems, methods, apparatuses, and computer program products for generating sequences for zero-tail discrete fourier transform (DFT)-spread-orthogonal frequency division multiplexing (OFDM) (ZT DFT-s-OFDM) reference signals, as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

One embodiment relates to the area of waveform design for upcoming $5^{th}$ generation (5G) wireless systems. In particular, certain embodiments provide a method for generating reference sequences suitable for zero-tail DFT-spread-OFDM (ZT DFT-s-OFDM) modulation. ZT DFT-s-OFDM signals have been recently proposed as an enhancement of traditional OFDM and DFT-s-OFDM waveforms, where the CP (cyclic prefix) is replaced by a low power tail. Such tail is obtained as a natural output of the Inverse Fast Fourier Transform (IFFT) rather than being appended to the generated time symbols as for the case of the CP. Differently from waveforms adopting a CP, in ZT DFT-s-OFDM the duration of the low power tail does not need to be defined in the frame numerology but can be set dynamically accordingly to the estimated delay spread of the channel. This simplifies the system design since it decouples the radio numerology from the channel characteristics, also improving the coexistence between neighbor cells. Moreover, it allows overcoming the aforementioned inefficiencies of a hard-coded CP.

A ZT DFT-s-OFDM signal also features a short low power head. While the low power tail is intended to cope with the measured delay spread of the channel, the low power head is inserted for avoiding the power regrowth at the last samples of the tail due to the cyclicity of the IFFT operation.

Another significant advantage of ZT DFT-s-OFDM is its improved spectral containment with respect to OFDM/DFT-s-OFDM. The presence of both low power head and tail allows for smoothening the transition between adjacent time symbols, with remarkable reduction of the Out-of-Band (OOB) emissions.

Being a straightforward enhancement of DFT-s-OFDM, ZT DFT-s-OFDM benefits from subcarrier-level processing and simple extension to Multiple Input Multiple Output (MIMO) antenna technology, as well as low Peak-to-Average Power Ratio (PAPR). As traditional DFT-s-OFDM, ZT DFT-s-OFDM suffers, however, from noise enhancement leading to a BLER (block error rate) penalty with respect to OFDM. Nonetheless, the performance gap tends to vanish in case of receive diversity, especially with 4 receive antennas.

ZT DFT-s-OFDM combines the simplicity and cost effectiveness of OFDM/DFT-s-OFDM with the additional benefits mentioned above; in that respect, it can be considered as a valid waveform candidate for a next 5G radio access technology.

Embodiments of the invention provide a method for designing reference sequences for ZT DFT-s-OFDM aimed at enabling channel estimation at the receiver and then coherent data detection. Designing such sequences for ZT DFT-s-OFDM is not a straightforward task since the constraint of generating a low power tail may affect the properties of the most common reference sequences used in current radio standards, for example the Zadoff-Chu sequences. Thus, a problem to be solved is how to avoid degradation of frequency response and therefore degradation of autocorrelation properties of a ZT DFT-s-OFDM signal due to the zero-inserting operation.

The desired properties for a set of reference sequences are listed below:

Low autocorrelation. When correlating a sequence against itself, the correlator output should return a power peak in correspondence of a zero offset and very limited output power in case of a non-zero offset. This allows to clearly identify at the receiver the position of the channel impulse response, thus enabling its correct estimate.

Limited cross-correlation. When correlating a sequence against a different sequence belonging to the same set, the output power of the correlator should be limited. This allows identifying the response of the desired channel and thus limiting the pollution due to the other reference sequences simultaneously transmitted.

Flat frequency response. The benefits of using reference sequences with a flat frequency response are twofold. First, a flat frequency response is necessary and sufficient condition for having zero-autocorrelation in the time domain. Further, it enables a proper frequency domain equalization. A selective frequency response of the reference sequence may lead to a selective enhancement of the noise power over specific portion of the frequencies, and thus to a degraded estimate and poor equalization performance.

Low Peak-to-Average Power Ratio (PAPR). Having sequences with limited power amplitude fluctuations allows using a low input backoff at the analog power amplifier, with benefits in terms of transmitter power efficiency.

Large cardinality. Having a large set of reference sequences featuring the same attractive properties is of paramount importance, especially in the case of dense cells deployment where devices may need to discriminate the channel response of the desired links from a large number of interfering links. The usage of MIMO technologies with a large number of antennas further exacerbates the necessity of a large set of reference sequences, e.g., for Massive MIMO applications.

Figure 2:
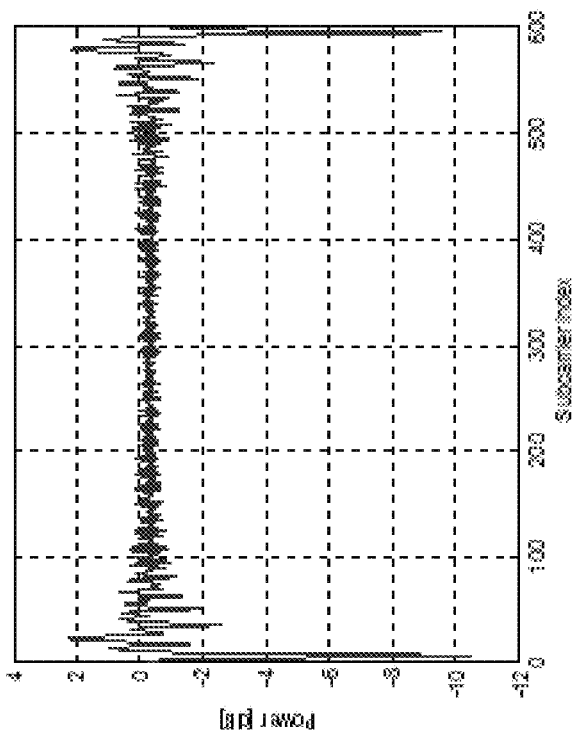
FIG. 2 illustrates the final time domain and its frequency response of a ZT DFT-s-OFDM reference sequence generated with the traditional ZT DFT-s-OFDM transmitter chain.
Figure 2:
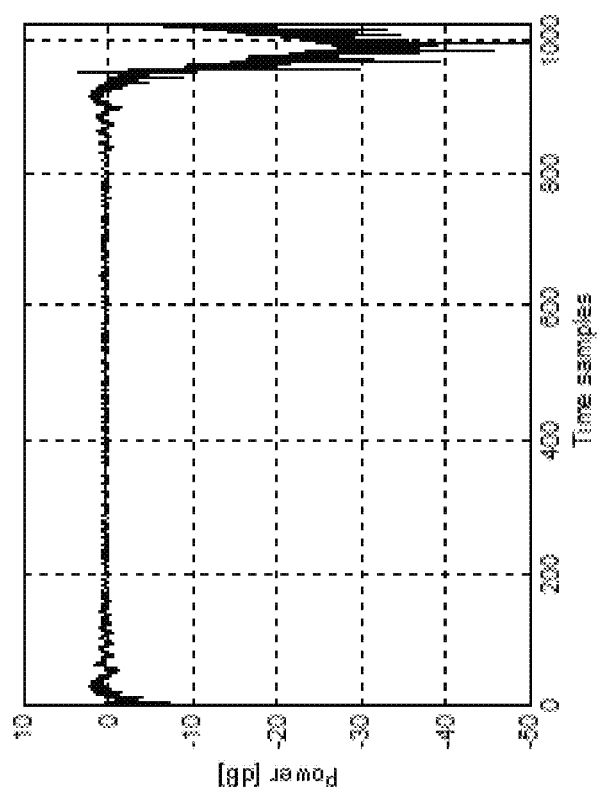

FIG. 1 illustrates a block diagram of the transmitter chain of ZT DFT-s-OFDM. The zero padding block adds a zero vector at the beginning and at the end of the input sequence. This translates to a low power tail and low power head of the signal transmitted over the air, such that the benefits of the ZT DFT-s-OFDM modulation can be exploited. Unfortunately, such zero-insertion operation may affect the properties of the input sequence. For instance, in case the starting sequence is a Zadoff-Chu sequence (described below), such zero-vector insertion also leads to a degradation of the frequency domain response, as shown in FIG. 2. This in turn affects the autocorrelation property of the sequence, leading to a poor channel estimate. In particular, FIG. 2 illustrates a final time domain and its frequency response of a ZT DFT-s-OFDM reference sequence generated with the traditional ZT DFT-s-OFDM transmitter chain (such as that of FIG. 1).

Zadoff-Chu (ZC) sequences are a family of complex sequences fulfilling all the properties mentioned above. They feature zero autocorrelation and constant cross-correlation limited to √L, where L is the length of the sequence. Further, ZC sequences have constant amplitude over both time and frequency domain. In case the length L of the ZC sequence is a prime number, the set of sequences fulfilling the mentioned properties has cardinality equal to L−1.

ZC sequences have been widely used in LTE uplink for the Demodulation Reference Symbols (DMRSs) and the Sounding Reference Signals (SRSs). The user equipment (UEs) are transmitting their DMRSs in the same time symbol and their signals are received time-aligned at the Base Station (BS) provided an UE-specific timing advance (TA) command is issued to cope with the different propagation delays. UEs can be instructed to use a different cyclic shift of the same ZC sequence. In case the value of the cyclic shift is larger than the delay spread of the channel, the BS can discriminate from the same symbol the multiple channel impulse responses without collisions by simply correlating against the ZC sequence. This is due to the cyclic zero autocorrelation property. For instance, given the 66.67 us time symbol duration in LTE (without CP) and assuming a maximum delay spread equal to the CP, i.e., 4.7 us, up to 14 channel impulse responses can be estimated from the same symbol. Different cyclic shifts of the same base sequence can also be transmitted from different antennas of the same UE in case of Single User MIMO transmission modes.

In case different base sequences are used, the estimate of the multiple channel impulse responses can be polluted by their non-zero (though limited) cross-correlation. It is then a desirable design practice striving to use different sequences in cells located at significant distance with each other such that their mutual harm can be reduced.

It is noted that, since in LTE the number of resource elements where the ZC sequence elements are mapped is a multiple of a Physical Resource Block (PRB) size and therefore an even number, ZC sequences are cyclically extended in practical implementations. Such cyclical extension has been shown to provide a negligible impact on the sequence properties.

Adapting reference sequences such as ZC sequences to ZT DFT-s-OFDM waveform may affect their attractive properties. In particular, their flat frequency response characteristic is inevitably compromised. Embodiments provide an iterative normalization method that searches for a deliberate distortion of the original sequence that is directed to preserving both flat frequency response and low power tail/head in the time domain. As mentioned above, the original reference sequences could be ZC sequences, cyclic extensions of ZC sequences, corresponding transformed versions of sequences (for instance in the time domain of both ZC sequences as well as cyclic extensions of the same). However, it should be noted that certain embodiments provide a general approach which is not tied to any specific sequence, and any base reference sequence could be used. Thus, embodiments are not limited to any specific base reference sequence.

Figure 3:
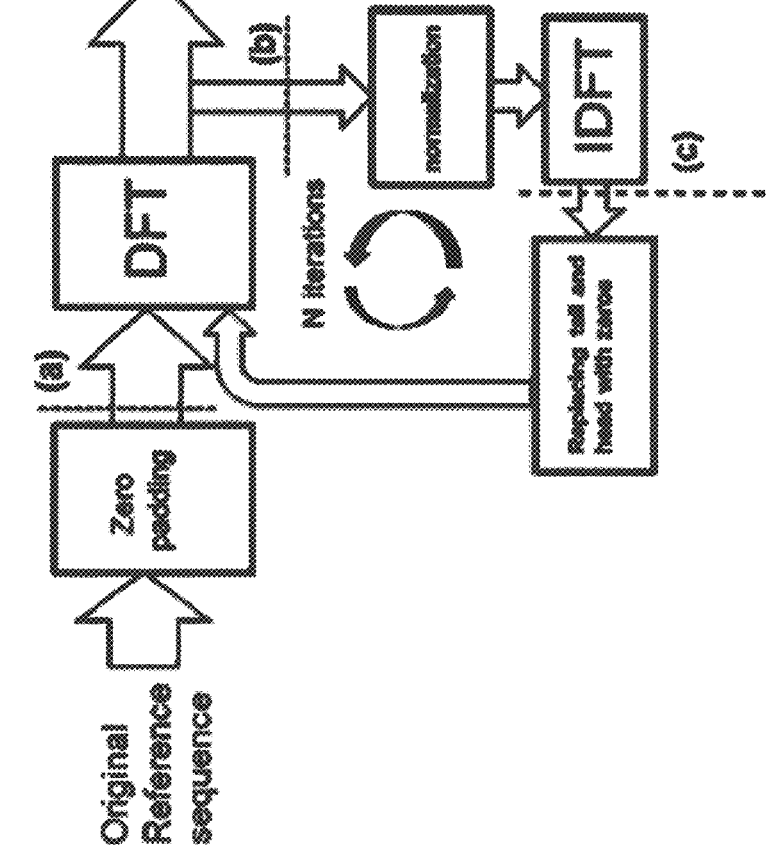
FIG. 3 illustrates a block diagram of the iterative normalization technique, according to an embodiment of the invention.

FIG. 3 illustrates a block diagram of an iterative normalization technique, according to one embodiment. Referring to FIG. 3, starting from the zero-padded original sequence in section (a), the procedure can be described according to the following steps:

1. Compute the frequency domain response of the sequence by DFT.
2. Normalize to unitary power the elements of the obtained frequency domain sequence while maintaining phase of each element. The combined operation of step (1) and (2) is a phase-only transform (PHOT) since it forces a constant amplitude of the output vector. The signal is imposed at this stage to have a flat frequency response.
3. Convert again to time domain by IDFT. It is noted that the sequence at this stage is likely to be significantly different from the initial zero-padded sequence since it is obtained from a frequency vector which has undergone the normalization operation in step (2). This is likely to cause a power regrowth at the head and at the tail of the sequence.
4. Generate again a zero-padded sequence by forcing a zero head and tail of the sequence.
5. Go back to step 1.

This procedure is repeated for a number of iterations. In certain embodiments, the number of iterations may be configured. According to an embodiment, for example, ten or more iterations are performed. However, embodiments are not limited to this range of iterations and any number of iterations may be applied. In some embodiments, a UE may be configured by the base station or eNB.

At each iteration, the power regrowth at the head and tail of the sequence at step (3) becomes smaller and smaller, and therefore also the distortion operated by the zero padding at step (4). By repeating the procedure for a number of iterations, it is possible to design sequences having a zero-tail and preserving the flat frequency response. Afterwards, the final sequence undergoes the traditional process of DFT, subcarrier mapping and IFFT to generate the transmit signal.

In an embodiment of the invention, the final transmit sequence can be designed offline and used in normal operational mode. In another embodiment of the invention, the iterative normalization procedure can be run once the connection is established (at session startup) and the obtained transmit sequence can be used at every successive frame transmission. In yet another embodiment, the parameters (or a selected set of these) for the normalization procedure is transmitted whenever a UE becomes active in a cell (whenever RRC connection is established). As part of the parameter exchange, the UE's capabilities of generating sequences may be part of the configuration.

Figure 4:
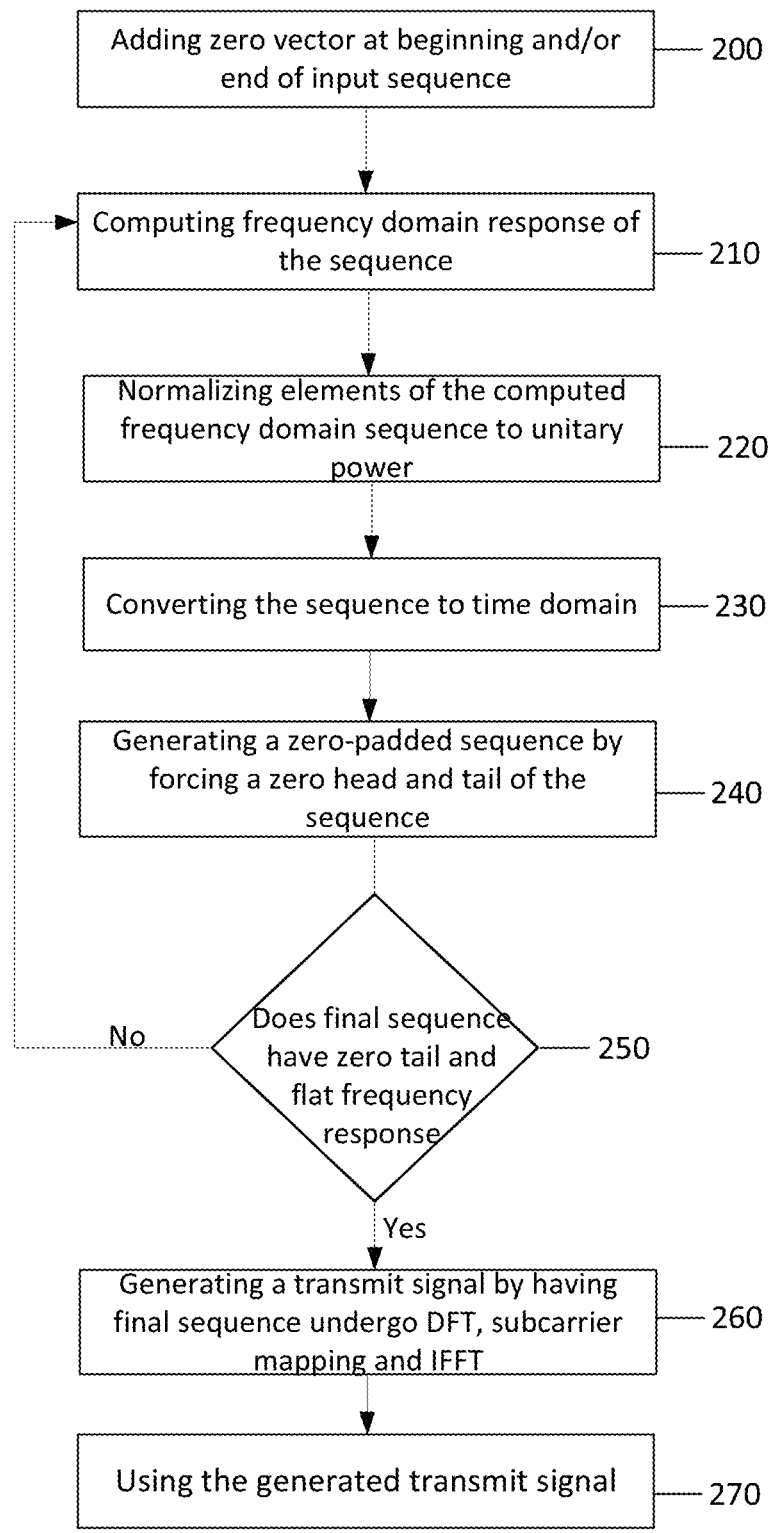
FIG. 4 illustrates an example flow diagram of a method, according to one embodiment.

FIG. 4 illustrates a flow diagram of a method for generating sequences for ZT DFT-s-OFDM reference signals, according to one embodiment. A result of the method is that sequences that feature both flat frequency response and low power tail/head in time domain. As illustrated in FIG. 4, the method may include, at 200, adding a zero vector at least one of at the beginning and/or at the end of the input sequence. This is done to obtain at least one of low-power head and/or tail to the signal. In one embodiment, the input sequence may be a Zadoff-Chu sequence. However, other embodiments are not limited to any specific base reference sequence.

The method of FIG. 4 may then include, at 210, computing linear transformation, for example a frequency domain response, of the sequence, for example by DFT. At 220, the method may include normalizing elements of the computed linear transformation (e.g., frequency domain) sequence to unitary power, while maintaining the phase of each element in order to have a flat frequency response. At 230, the method may include converting the sequence to time domain, for example by IDFT. Due to the normalizing step, there may be power regrowth at the head and at the tail of the sequence. To compensate for this, the method may include, at 240, generating a zero-padded sequence again by forcing a zero head and tail of the sequence.

In an embodiment, steps 210, 220, 230, and 240 may be repeated such that at each iteration round, the power regrowth at the head and tail of the sequence becomes smaller and also the distortion due to zero padding becomes smaller (and frequency response improves). Hence, a sequence with zero-tail and flat frequency response is obtained. Therefore, the method of FIG. 4 may include, at 250, determining whether a final sequence with zero-tail and flat frequency response has been obtained. If the sequence does not have zero-tail and flat frequency response, then the method returns to step 210 where steps 210, 220, 230, and 240 are repeated. If it is determined that a final sequence with zero-tail and flat frequency response has been obtained, then the method may proceed, at 260, by generating a transmit signal by having the final sequence undergo DFT, subcarrier mapping and IFFT.

In certain embodiments, the method may then include, at 270, using the generated transmit signal. For example, in one embodiment, the final transmit sequence may be used in normal operational mode, for example the final transmit sequence may be used at every successive frame transmission.

Figure 5:
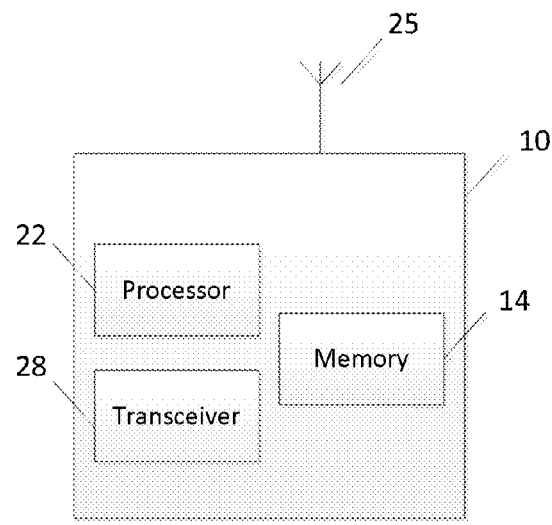
FIG. 5 illustrates a block diagram of an apparatus, according to an embodiment.

FIG. 5 illustrates an example of an apparatus 10 according to an embodiment. In an embodiment, apparatus 10 may be a node, host, or server in a communications network or serving such a network. For example, in certain embodiments, apparatus 10 may be a network node or access node for a radio access network, such as a base station in UMTS or eNB in LTE or LTE-A. However, in other embodiments, apparatus 10 may be other components within a radio access network, such as a mobile device or UE. It should be noted that one of ordinary skill in the art would understand that apparatus 10 may include components or features not shown in FIG. 5, for example such as the components shown in FIGS. 1 and 3 discussed above.

As illustrated in FIG. 5, apparatus 10 includes a processor 22 for processing information and executing instructions or operations. Processor 22 may be any type of general or specific purpose processor. While a single processor 22 is shown in FIG. 5, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

In some embodiments, apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be controlled by memory 14 and processor 22 to add a zero vector at least one of at the beginning and/or at the end of the input sequence. This may be done to obtain at least one of low-power head and/or tail to the signal. In one embodiment, the input sequence may be a Zadoff-Chu sequence. However, in other embodiments, the input sequence may be another type of base reference sequence.

According to certain embodiments, apparatus 10 may be controlled by memory 14 and processor 22 to compute frequency domain response of the sequence, for example by DFT. In an embodiment, apparatus 10 may be controlled by memory 14 and processor 22 to normalize elements of the computed frequency domain sequence to unitary power, while maintaining the phase of each element in order to have a flat frequency response. In some embodiments, apparatus 10 may be controlled by memory 14 and processor 22 to convert the sequence to time domain, for example by IDFT. Due to the normalizing step, there may be power regrowth at the head and at the tail of the sequence. To compensate for this, apparatus 10 may be controlled by memory 14 and processor 22 to generate a zero-padded sequence again by forcing a zero head and tail of the sequence.

In an embodiment, apparatus 10 may be further controlled by memory 14 and processor 22 to determine whether a final sequence with zero-tail and flat frequency response has been obtained. If the sequence does not have zero-tail and flat frequency response, then apparatus 10 may be further controlled by memory 14 and processor 22 to repeat the steps of computing, normalizing, converting, and generating outlined above. If it is determined that a final sequence with zero-tail and flat frequency response has been obtained, then apparatus 10 may be further controlled by memory 14 and processor 22 to generate a transmit signal by having the final sequence undergo DFT, subcarrier mapping and IFFT.

In certain embodiments, apparatus 10 may be further controlled by memory 14 and processor 22 to use the generated transmit signal. For example, in one embodiment, the final transmit sequence may be used in normal operational mode, for example the final transmit sequence may be used at every successive frame transmission.

Figure 6:
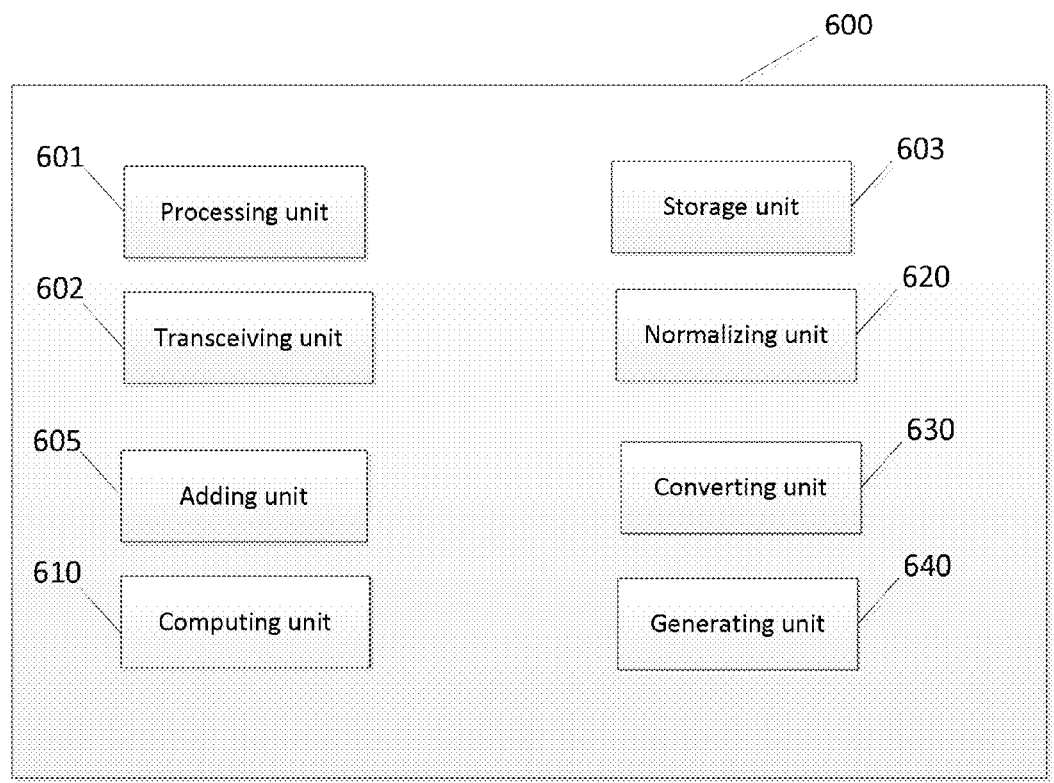
FIG. 6 illustrates a block diagram of an apparatus, according to another embodiment.

FIG. 6 illustrates a block diagram of an apparatus 600, according to one embodiment. As illustrated in the example of FIG. 6, apparatus 600 may include a processing unit or means 601 for controlling apparatus 600 and for carrying out instructions of a computer program, for example, by performing arithmetic, logical, control and input/output (I/O) operations specified by the instructions. Apparatus 600 may also include a storage unit or means 603 for storing information including, but not limited to, computer program instructions or software modules that provide functionality when executed by processing unit 601. Apparatus 600 may further include a transceiving unit or means 602 for receiving or transmitting information.

In certain embodiments, apparatus 600 may also include an adding unit or means 605 for adding a zero vector at least one of at the beginning and/or at the end of the input sequence. This may be done to obtain at least one of low-power head and/or tail to the signal. In one embodiment, the input sequence may be a Zadoff-Chu sequence. However, in other embodiments, the input sequence may be another type of base reference sequence.

According to certain embodiments, apparatus 600 may also include a computing unit or means 610 for computing frequency domain response of the sequence, for example by DFT. In an embodiment, apparatus 600 may also include a normalizing unit or means 620 for normalizing elements of the computed frequency domain sequence to unitary power, while maintaining the phase of each element in order to have a flat frequency response. In some embodiments, apparatus 600 may include a converting unit or means 630 for converting the sequence to time domain, for example by IDFT. Due to the normalizing step, there may be power regrowth at the head and at the tail of the sequence. To compensate for this, apparatus 600 may include a generating unit or means 640 for generating a zero-padded sequence again by forcing a zero head and tail of the sequence.

In an embodiment, apparatus 600 may be controlled by processing unit 601 to determine whether a final sequence with zero-tail and flat frequency response has been obtained. If the sequence does not have zero-tail and flat frequency response, then apparatus 600 may be further controlled by memory 14 and processor 22 to repeat the steps of computing, normalizing, converting, and generating outlined above. If it is determined that a final sequence with zero-tail and flat frequency response has been obtained, then generating unit 640 may generate a transmit signal by having the final sequence undergo DFT, subcarrier mapping and IFFT.

In certain embodiments, apparatus 600 may be further controlled by processing unit 601 and storage unit 603 to use the generated transmit signal. For example, in one embodiment, the final transmit sequence may be used in normal operational mode, for example the final transmit sequence may be used at every successive frame transmission.

The effectiveness of the iterative normalization technique, as described herein, in generating suitable reference sequences for ZT DFT-s-OFDM waveform has been numerically evaluated, as will be discussed in the following. Further, the properties of the generated sequences in terms of autocorrelation, cross-correlation and PAPR have also been evaluated. Finally, the channel estimation performance has been evaluated. It should be noted that the below is only to be seen as exemplary in nature to show that embodiments are applicable in general.

Referring to an LTE-like numerology for a 20 MHz band configuration, i.e., 1200 subcarriers and a 2048 FFT size. The number of the zero pre-DFT samples is set to 84; this leads approximately to a low power tail duration of around 4.7 us, which corresponds to the CP duration in LTE. The number of zero-head samples is instead limited to 6 since it is meant to avoid an excessive power regrowth at the end of the ZT DFT-s-OFDM symbol. Though embodiments can be used for any sequence, we refer herein to the ZC sequence as starting sequence.

In order to fit with the numerology expressed above, the starting ZC sequence has then a length equal to 1110. The starting ZC sequence is obtained as a cyclically extended version of a basic ZC sequence having length equal to the prime number 1109. The sequence is then zero-padded at the head and at the tail as shown in FIG. 3, and the iterative normalization process is then applied. For the following, it is referred to that the starting ZC sequence for the input sequence of the iterative normalization process and as the final ZC sequence as its output.

Figure 7:
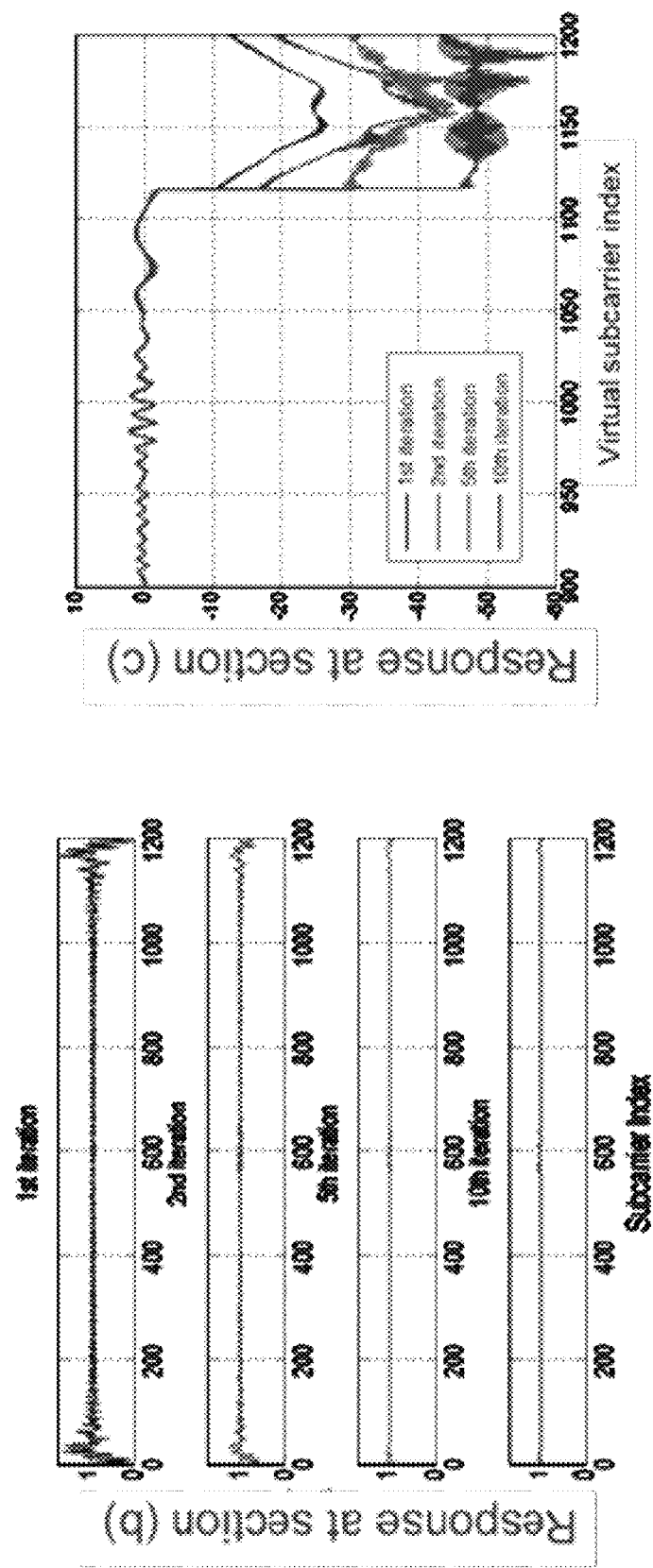
FIG. 7 illustrates the evolution of the frequency response and the residual tail power response at different iterations of the iterative normalization technique.
Figure 8:
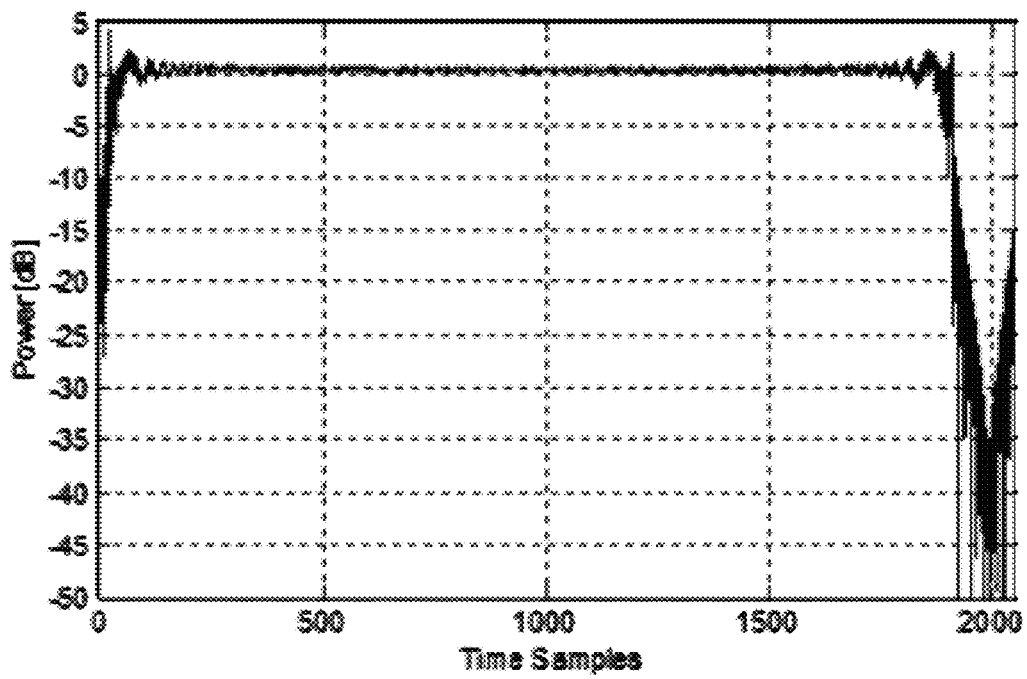
FIG. 8 illustrates a diagram of ZT DFT-s-OFDM reference signal in the time domain.

FIG. 7 illustrates the evolution of the frequency and time response, respectively, of the sequences at section (b) and (c) with reference to the diagram in FIG. 3. For the time response, only the pre-DFT tail is displayed, as a function of the pre-DFT virtual subcarriers. The sequence at section (b) and iteration 1 corresponds to the frequency response of starting ZC sequence, which as expected exhibits a non-flat response. By increasing the number of iterations, the frequency response tends to flatten. Similarly, the time sequence at section (c) and iteration 1 features an increase of the tail power due to the frequency normalization in step 2 of the procedure. Nonetheless, such tail power tends to decrease with the iterations. After a number of iterations, the residual tail tends to zero and the frequency response is flat. The final time domain ZT DFT-s-OFDM signal is illustrated in FIG. 8. The envelope of the low power tail approaches ~−35 dB, which is lower than the value typically obtained with ZT DFT-s-OFDM symbols carrying data. This confirms in practice the validity of embodiments of the invention in generating a ZT DFT-s-OFDM reference sequence with flat frequency response and low power tail.

As mentioned above, ensuring a flat frequency response leads to a zero autocorrelation in the time domain. However, differently from the traditional ZC processing where a single autocorrelation at the receiver allows to retrieve a large set of channel responses due to their cyclic shift, here, every cyclic shift of the starting sequence in input to the iterative normalization process leads to a different final output sequence. In other words, given two starting ZC sequence c1 and c2 where one is obtained as a cyclic shift of the other, at the end of the iterative normalization process they translate to two sequences c1$f$ and c2$f$ that are not strictly cyclically shifted anymore. It is then possible to correlate against the specific final ZC sequence at the receiver.

Figure 9:
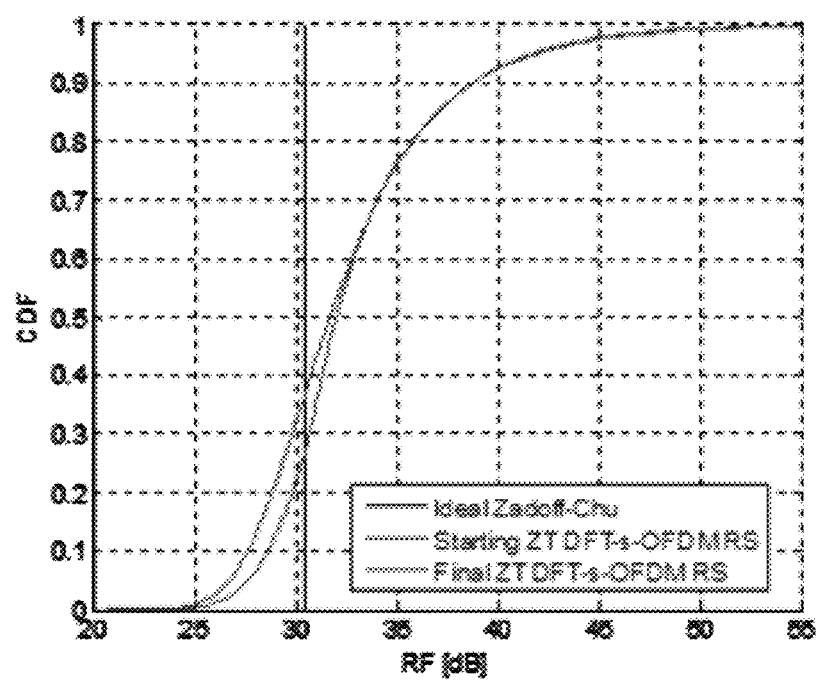
FIG. 9 illustrates a diagram of cross-correlation performance, according to an embodiment.

For the cross-correlation analysis, a large set of sequences generated starting by the original ZC sequences is considered. The cross-correlation performance is evaluated in terms of Rejection Factor (RF), defined as the ratio of the maximum autocorrelation power and the cross-correlation power over another sequence in the set. FIG. 9 illustrates the Cumulative Distribution Function (CDF) of the RF obtained over a large set of sequence combinations. The case of ideal ZC sequence (i.e., without any zero-padding and normalization) is also shown for the sake of comparison. For the ideal ZC sequence, the RF is constant and equal to the sequence length. For both starting and final ZC sequences, the RF has a wider distribution due to the modification on the original ZC sequence. In the case of the basic sequence, more than 70% of the samples have higher RF than the original sequence, and for the remaining set of samples the RF is however not lower than 20 dB. The final ZC sequence has slightly lower RF for the lower part of the curve, but the performance degradation is however limited. This demonstrates the possibility of using different sequences in the set without generating strong mutual harm.

Figure 10:
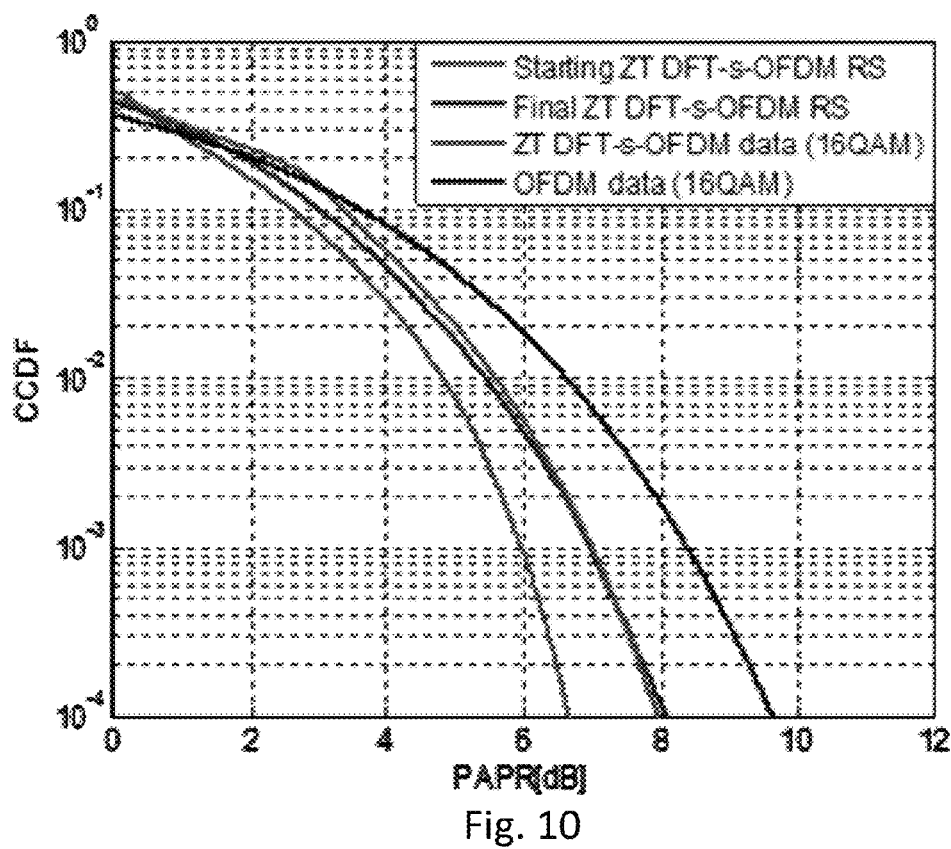
FIG. 10 illustrates Peak-to-Average Power Ratio (PAPR) performance, according to an embodiment.

FIG. 10 illustrates the Complementary Cumulative Distribution Function (CCDF) of the PAPR for the basic and the final ZC sequences. Results for ZT DFT-s-OFDM and OFDM symbols carrying data (16QAM modulation) are also shown for the sake of comparison. The starting ZC sequence has the lowest PAPR. Such sequence is indeed obtained by simply zero-padding the ideal ZC sequence, which has constant amplitude in the time domain. Such zero-padding only leads to a minor PAPR increase. As shown above, its low PAPR comes however at the expense of a degradation in the frequency response, which is particularly critical for reference sequences targeting frequency domain equalization. The final ZC sequence has a slightly larger PAPR. However, its performance is similar to the ZT DFT-s-OFDM symbols carrying data. As a consequence, the generation of the ZC sequences does not lead to the necessity of using a larger power amplifier backoff than the one which would be used for guaranteeing no data distortion. Note also that the gain over OFDM symbols with data is also preserved.

Finally, the channel estimation performance of the starting ZC sequence is compared with the final ZC sequence, considering the power delay profiles of Typical Urban and Indoor Office channel models, featuring an excess delay of around ~2.2 us and ~0.2 us, respectively. It is noted that both channels feature a significantly shorter delay spread than the low power tail duration. Results are obtained over a large number of independent channel realizations, by varying the Signal-to-Noise Ratio (SNR). A simple least-square channel estimation based on correlation at the receiver is used, i.e., no advanced estimators are applied.

Figure 11:
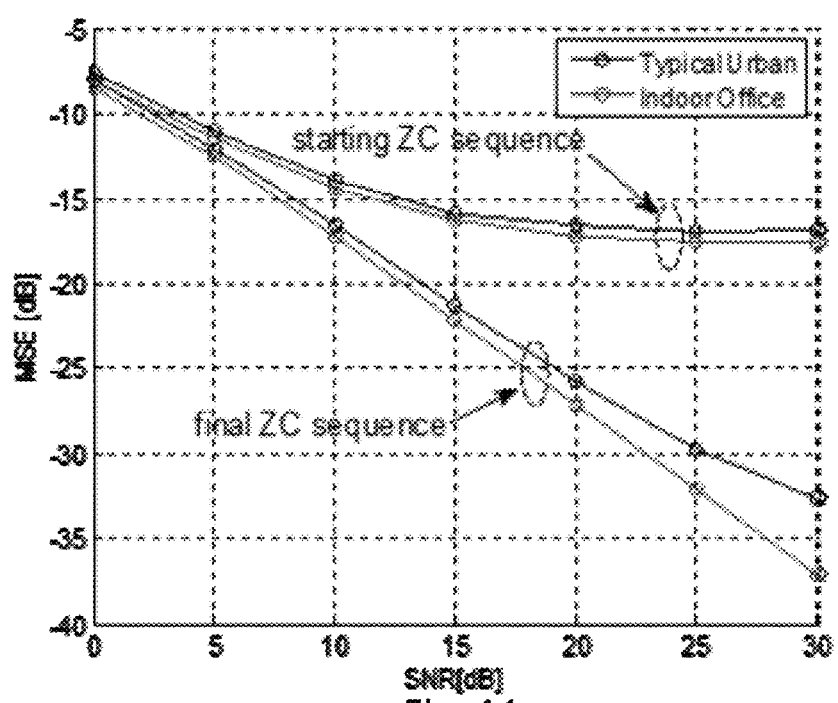
FIG. 11 illustrates channel estimation performance, according to an embodiment.

FIG. 11 illustrates the Mean Square Error (MSE) of the channel estimate for both cases of starting and final ZC sequence. While the performance gap of the sequences is not significant at low SNRs where the noise power is the dominant degrading term in the channel estimation process, the start ZC sequence suffers rather soon of an error floor due to its poor autocorrelation performance. The MSE decreases instead rapidly for the final ZC sequence, given its zero-autocorrelation property. The estimate of the Indoor Office channel has slightly lower error than the Typical Urban case; this is due to its lower frequency selectivity, which reduces the impact of the residual noise.

Such numerical analyses proves the effectiveness of the invention in generating signals featuring the properties of ZT DFT-s-OFDM as well as the desired properties of reference sequences for channel estimation.

According to embodiments, programs, also called program products or computer programs, including software routines, applets and macros, may be stored in any apparatus-readable data storage medium and may include program instructions to perform particular tasks. A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality of any method or apparatus described herein may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that may be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
   (a) adding a zero vector to an input sequence;
   (b) performing an iterative manipulation of the input sequence until a final sequence with zero-tail and flat frequency response is obtained; and
   (c) generating a transmit signal by having the final sequence undergo discrete fourier transform (DFT), subcarrier mapping, and inverse fast fourier transform (IFFT).

2. The method according to claim 1, wherein the adding comprises adding the zero vector to at least one of a beginning and an end of the input sequence.

3. The method according to claim 1, wherein the performing of the iterative manipulation of the input sequence comprises one or more of:
   (d) computing linear transformation of the sequence;
   (e) normalizing elements of the computed linear transformation sequence to unitary power while maintaining phase of each of the elements;
   (f) converting the sequence to time domain;
   (g) generating a zero-padded sequence by forcing a zero head and tail of the sequence; and
   (h) repeating steps (d)-(g) until the final sequence with zero-tail and flat frequency response is obtained.

4. The method according to claim 1, wherein the performing of the iterative manipulation of the input sequence comprises one or more of:
   (d) converting the sequence to time domain;
   (e) generating a zero-padded sequence by forcing a zero head and tail of the sequence;
   (f) converting the sequence to frequency domain;
   (g) normalizing elements of the computed linear transformation sequence to unitary power while maintaining phase of each of the elements; and
   (h) repeating steps (d)-(g) until the final sequence with zero-tail and flat frequency response is obtained.

5. The method according to claim 3, wherein the computing of the linear transformation of the sequence further comprises computing frequency domain response of the sequence.

6. The method according to claim 3, wherein a number of times steps (d)-(g) are repeated can be configured.

7. The method according to claim 6, wherein a base station or evolved node B (eNB) performs the configuration.

8. The method according to claim 1, further comprising using the generated transmit signal at every successive frame transmission.

9. The method according to claim 1, wherein the input sequence comprises a Zadoff-Chu sequence.

10. The method according to claim 5, wherein the computing comprises computing the frequency domain response of the sequence by discrete fourier transform (DFT).

11. The method according to claim 1, wherein the converting comprises converting the sequence to time domain by inverse discrete fourier transform (IDFT).

12. An apparatus, comprising:
    at least one processor; and
    at least one memory comprising computer program code, the at least one memory and the computer program code are configured, with the at least one processor, to cause the apparatus at least to
    (a) add a zero vector to an input sequence, (b) perform an iterative manipulation of the input sequence until a final sequence with zero-tail and flat frequency response is obtained, and (c) generate a transmit signal by having the final sequence undergo discrete fourier transform (DFT), subcarrier mapping, and inverse fast fourier transform (IFFT).

13. The apparatus according to claim 12, wherein the at least one memory and the computer program code are further configured, with the at least one processor, to cause the apparatus at least to add the zero vector to at least one of a beginning and an end of the input sequence.

14. The apparatus according to claim 12, the at least one memory and the computer program code are further configured, with the at least one processor, to cause the apparatus at least to perform the iterative manipulation of the input sequence according to one or more of the following:

(d) compute linear transformation of the sequence;

(e) normalize elements of the computed linear transformation sequence to unitary power while maintaining phase of each of the elements;

(f) convert the sequence to time domain;

(g) generate a zero-padded sequence by forcing a zero head and tail of the sequence; and (h) repeat steps (d)-(g) until the final sequence with zero-tail and flat frequency response is obtained.

15. The apparatus according to claim 12, wherein the performing of the iterative manipulation of the input sequence comprises one or more of:

(d) converting the sequence to time domain;

(e) generating a zero-padded sequence by forcing a zero head and tail of the sequence;

(f) converting the sequence to frequency domain;

(g) normalizing elements of the computed linear transformation sequence to unitary power while maintaining phase of each of the elements; and (h) repeating steps (d)-(g) until the final sequence with zero-tail and flat frequency response is obtained.

16. The apparatus according to claim 14, the at least one memory and the computer program code are further configured, with the at least one processor, to cause the apparatus at least to compute the linear transformation of the sequence by computing frequency domain response of the sequence.

17. The apparatus according to claim 14, wherein a number of times steps (d)-(g) are repeated can be configured.

18. The apparatus according to claim 17, wherein a base station or evolved node B (eNB) performs the configuration.

19. The apparatus according to claim 12, wherein the at least one memory and the computer program code are further configured, with the at least one processor, to cause the apparatus at least to use the generated transmit signal at every successive frame transmission.

20. The apparatus according to claim 12, wherein the input sequence comprises a Zadoff-Chu sequence.

21. The apparatus according to claim 16, wherein the at least one memory and the computer program code are further configured, with the at least one processor, to cause the apparatus at least to compute the frequency domain response of the sequence by discrete fourier transform (DFT).

22. The apparatus according to claim 14, wherein the at least one memory and the computer program code are further configured, with the at least one processor, to cause the apparatus at least to convert the sequence to time domain by inverse discrete fourier transform (IDFT).

23. A computer program, embodied on a non-transitory computer readable medium, the computer program configured to control a processor to perform a process, comprising:

(a) adding a zero vector to an input sequence;

(b) performing an iterative manipulation of the input sequence until a final sequence with zero-tail and flat frequency response is obtained; and (c) generating a transmit signal by having the final sequence undergo discrete fourier transform (DFT), subcarrier mapping, and inverse fast fourier transform (IFFT).

* * * * *